BRYNGDAHL 3,544,219
OPTICAL COMPUTATION OF SECOND DERIVATIVE
Filed Feb. 5, 1968 — 2 Sheets-Sheet 1
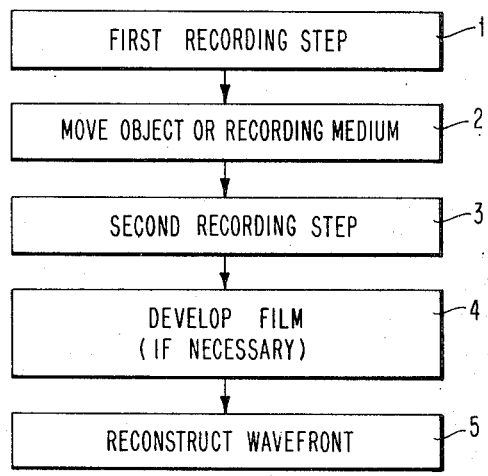
FIG.1
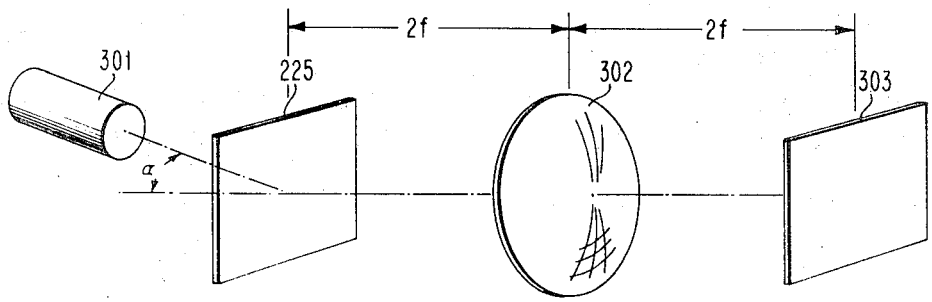
FIG.3
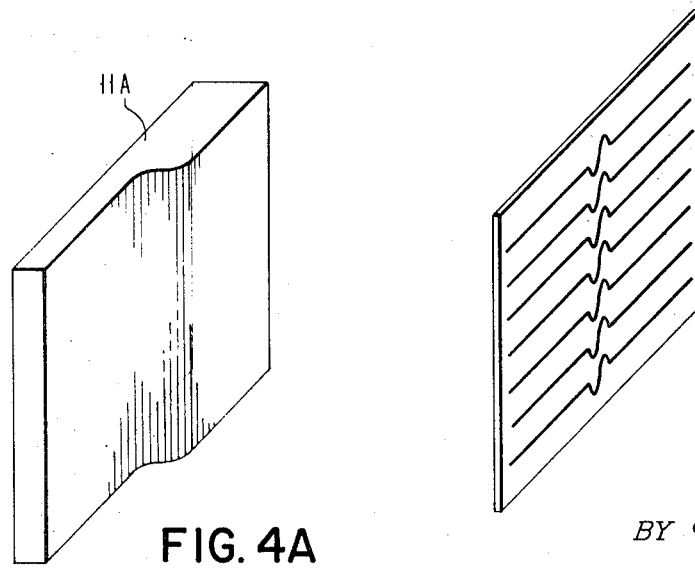
FIG.4A
FIG.4B
*INVENTOR*
OLOF BRYNGDAHL
BY Elmer Galbi
ATTORNEY

United States Patent Office 3,544,219
Patented Dec. 1, 1970

---

3,544,219
OPTICAL COMPUTATION OF SECOND DERIVATIVE
Olof Bryngdahl, Los Gatos, Calif., assignor to International Business Machines Corporation, Armonk, N.Y., a corporation of New York
Filed Feb. 5, 1968, Ser. No. 702,878
Int. Cl. G01b 9/02; G02b
U.S. Cl. 356—106
8 Claims

ABSTRACT OF THE DISCLOSURE

Double exposure holography is used to obtain the second derivative of the function which describes a given object. The object is illuminated with coherent light and an image of the object is created. The light carrynig the image information is divided into two beams. The paths of these beams are arranged such that (a) each beam creates an image of the object on the same photographic plate, (b) the images created by the two beams are shifted, or sheared, relative to each other, and (c) there is an appropriate angle between the optical axis of the two beams, such that the beams interact to create a hologram. The photographic recording medium is exposed twice. The only difference between the first exposure and the second exposure is that the object, or the recording medium, is slightly shifted. The photographic plate is developed and then illuminated with coherent light in an optical system which creates an image of the object which was used to form the hologram. Superimposed on the image of the object will be lines, or fringes, which represent the second derivative of the function which describes the object.

CROSS REFERENCES TO RELATED APPLICATIONS

Copending application Ser. No. 702,879 entitled "Shearing Interferometry By Means Of Holography," filed Feb. 5, 1968.

BACKGROUND OF THE INVENTION

Field of the invention

The present invention relates to special purpose computing, and more particularly, to an optical technique for obtaining a representation of the second derivative of a function.

Description of the prior art

There are many instances where one would like to obtain the second derivative of an optical wavefront. For example, diffusion and conduction cause changes in refractive index and the diffusion and conduction constants are proportional to the second derivative of the changes in refractive index. One can easily obtain a wavefront, the changes in which reflect changes in refractive index. In order to obtain an indication of the diffusion and conduction constants, one must obtain the second derivative of this wavefront.

It is known that the lines in a shearing interferogram essentially represent the first derivative of the function which represents the object used to create the interferogram. Furthermore, as shown in the above reference copending application, double exposure holography can be advantageously used to generate shearing interferograms.

SUMMARY OF THE INVENTION

An object of the present invention is to provide a simple technique for obtaining the second derivative of a function.

Another object of the present invention is to provide a method of obtaining a representation of the second derivative of a wavefront.

A further object of the present invention is to provide an improved technique for optically computing the second derivative of a function.

The present invention demonstrates how double exposure holography can be used to obtain the second derivative o fthe function which describes a given object. The object is illuminated with coherent light and an image of the object is created. The light carrying the image information is divided into two beams. The paths of these beams are arranged such that (a) each beam creates an image of the object on the same photographic medium, (b) the images created by the two beams are shifted, or sheared, relative to each other, and (c) there is an appropriate angle between the optical axis of the two beams, such that the beams interact to create a hologram. The photographic recording medium is exposed twice. The only difference between the first exposure and the second exposure is that the object, or the recording medium, is slightly shifted. The photographic medium is developed and then illuminated with coherent light in an optical system which creates an image of the object which was used to form the hologram. Superimposed on the image of the object will be lines, or fringes, which represent the second derivative of the function which describes the object.

BRIEF DESCRIPTION OF THE DRAWING

FIG. 1 illustrates the sequence of steps which occur in practicing the present invention.

FIG. 3 shows the apparatus used during the reconstruction step of the present invention.

FIGS. 4A and 4B show an example of the object and the resulting fringes.

DESCRIPTION OF A PREFERRED EMBODIMENT

Figure 2:
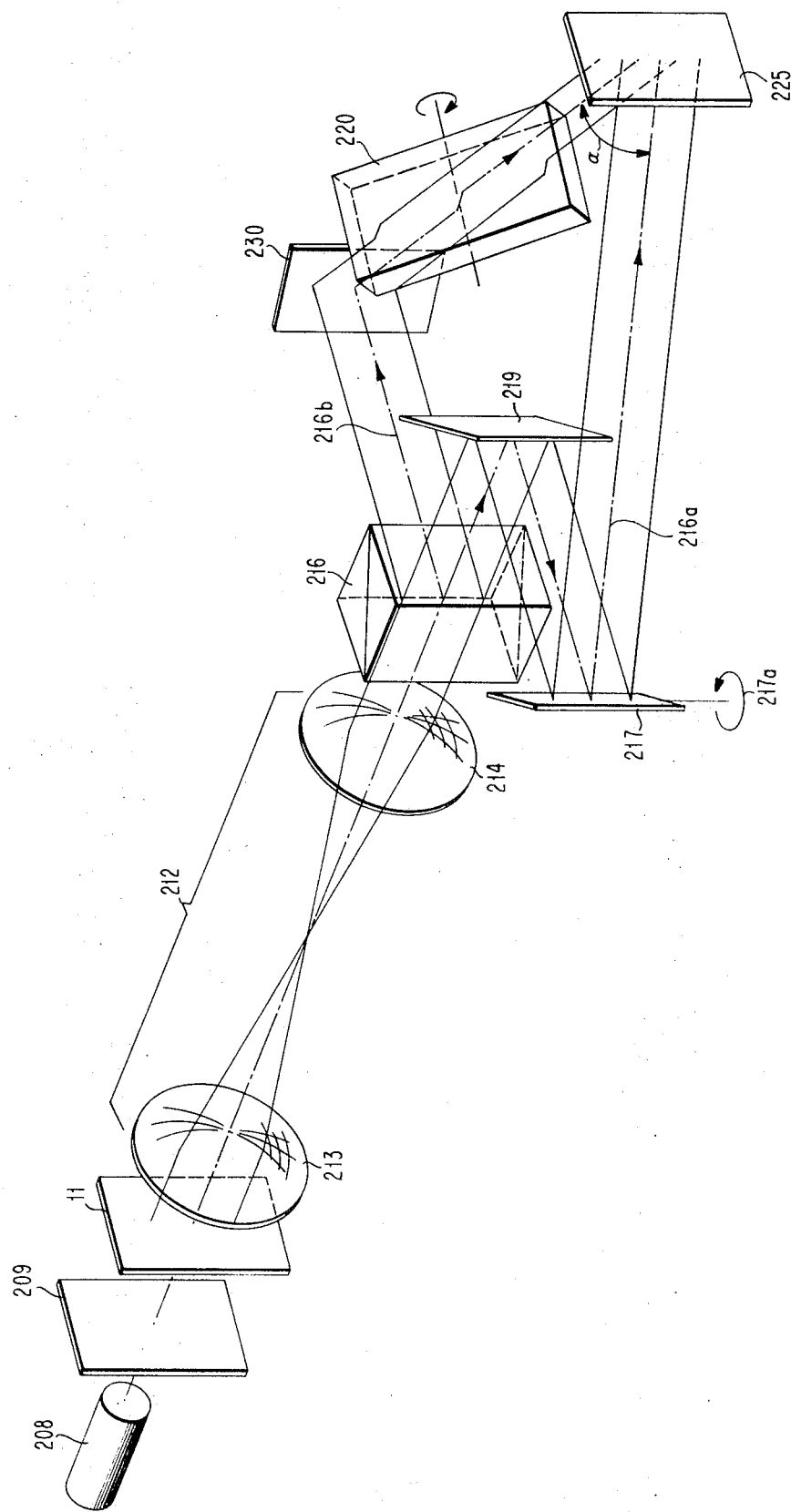
FIG. 2 shows the apparatus used during the recording process of the present invention.

The apparatus used to practice the present invention can be identical to the apparatus shown and claimed in the above referenced co-pending application; however, in practicing the present invention, the apparatus is used in a different manner and entirely different results are achieved. There are five major steps in the present invention. During the first step, an image hologram of the object under consideration is recorded on a photographic film. The second step involves slightly moving the object, or the recording medium. During the third step, another image hologram is made while the object, or the recording medium, is in the new position. This second hologram is recorded on the same photographic film as used in the first step. The photographic film is then developed, if film which requires development is used. The fifth step involves illuminating the developed photographic film to create an image of the object. This image appears with fringes thereon which represent the second derivative of the function which describes the object.

Apparatus which can be used to construct and record each of the holograms is shown in FIG. 2. It includes a coherent, collimated light source 208, a shutter 209, an imaging system 212, a beam splitter 216, which divides the light from source 208 into two beams designated 216a and 216b, means for equalizing path lengths 216a and 216b consisting of mirrors 217 and 219, and a transparent plate 220 which slightly shifts the light travelling along path 216b. Mirrors 230, 217 and 219 are adjusted so that the light travelling along both paths 216a and 216b is focussed on photographic recording medium 225. At the plane of film 225, beams 216a and 216b are separated by about 20 degrees. Due to the action of plate 220, the image carried by the light on path 216b is slightly shifted relative to the image created by the light in beam 216a. Imaging system 212 includes two lenses, 213 and 214. The focal power of lenses 213 and 214 and the distance between the various elements in the system are chosen so that images of object 11 appears on photographic recording medium 225. Since path lengths 216a and 216b are equal, the light travelling along both paths can be focussed on recording medium 225. Appropriate spacing can be calculated in a conventional manner using the known lens equation.

During the first recording step, object 11 is in place and shutter 209 is opened for a short period of time. For example, it could be opened for one second. The light in beams 216a and 216b interacts to form a hologram on recording medium 225. Next, object 11 is slightly moved. For example, it could be moved 0.04 inch. The amount of movement of object 11 should be in the same direction and substantially equal to the amount of shear introduced by the plate 220. Plate 220 could be a clear glass plate ⅜ inch thick; placed at a 45° angle. During the second recording step, the shutter 209 is again opened for a short period of time. For example, one second. During this time, the light in beams 216a and 216b interacts to record a second hologram on photographic recording film 225. After the second recording step, film 225 is developed if a film requiring development is used.

The last step in the process involves the reconstruction of the images of object 11. The apparatus used in the reconstruction step is shown in FIG. 3. When the image of object 11 is reconstructed, interference fringes appear thereon indicating the second derivative of the function which describes the object. The apparatus used during the reconstruction step includes a light source 301, a lens 302 and a screen 303. The developed photographic recording medium 225 is placed in the optical path in front of lens 303, as shown in FIG. 3. The light source 301 is offset by the angle $\alpha$ which is substantially equal to the separation between the beams 216a and 216b in the recording step.

In the example given above, the object is moved between the recording steps. Like results could be obtained by slightly moving the recording medium between recording steps. The important criteria is that the relative position of the object and the recording medium must be slightly changed between exposures.

As in conventional interferometry, a reference system of fringes can be introduced. With the present invention, this is done by slightly changing the angle $\alpha$ between exposure steps. For example, as shown herein, $\alpha$ equals 20°, and it could be changed by one tenth of a degree between exposures.

The direction of relative motion between the object and the recording medium should be the same as the direction of the shear introduced by element 220 if one wants to obtain a true representation of a second derivative. If the direction of the relative motion introduced between recording steps is not the same as the direction of the shear, one can obtain a representation of the partial derivative in one direction times the partial derivative in the other direction.

The following is a mathematical explanation of the reason that interference fringes appear on the reconstructed image indicating the second derivative of the function which defines the phase of the object.

The recorded intensity on film 225 is $$\left[\begin{array}{c}\text{Intensity due to}\\ \text{First recording step}\end{array}\right] + \left[\begin{array}{c}\text{Intensity due to}\\ \text{Second recording step}\end{array}\right]$$

$$|e^{i\phi(x,y)} + e^{i\{\phi(x,y+\Delta y_1)+\alpha x\}}|^2 + |e^{i\phi(x,y+\Delta y_2)} + e^{i\{\phi(x,y+\Delta y_1+\Delta y_2)+\alpha x\}}|^2 \quad (1)$$

If this image hologram is illuminated with a plane wave $e^{i\alpha x}$, multiplication of expression (1) with $e^{i\alpha x}$ results in $$e^{i\alpha x}[2 + e^{i\{\phi(x,y)-\phi(x,y+\Delta y_1)-\alpha x\}} + e^{-i\{\phi(x,y)-\phi(x,y+\Delta y_1)-\alpha x\}}$$
$$+ 2 + e^{i\{\phi(x,y+\Delta y_2)-\phi(x,y+\Delta y_1+\Delta y_2)-\alpha x\}}$$
$$+ e^{-i\{\phi(x,y+\Delta y_2)-\phi(x,y+\Delta y_1+\Delta y_2)-\alpha x\}}]$$

In a normal direction to the hologram we will then obtain $$e^{i\{\phi(x,y)-\phi(x,y+\Delta y_1)\}} + e^{i\{\phi(x,y+\Delta y_2)-\phi(x,y+\Delta y_1+\Delta y_2)\}} \quad (2)$$

Destructive interference will occur at the points which satisfy the following equation:

$$\phi(x,y) - \phi(x,y+\Delta y_1) - \phi(x,y+\Delta y_2) + \phi(x,y+\Delta y_1+\Delta y_2) = (2n+1)\pi \quad (3)$$

where $n$ is an integer.

Using Lagrange mean value theorem on the terms in Eq. (3) we get $$\phi(x,y) - \phi(x,y+\Delta y_1) = \Delta y_1 \frac{d\phi(x, y+\theta_1\Delta y_1)}{dy}$$

where $0 < \theta_1 < 1$ and $$\phi(x, y+\Delta y_2) - \phi(x, y+\Delta y_1+\Delta y_2) = \Delta y_1 \frac{d\phi(x, y+\Delta y_2+\theta_2\Delta y_1)}{dy}$$

where $0 < \theta_2 < 1$, and finally $$\Delta y_1 \frac{d\phi(x, y+\theta_1\Delta y_1)}{dy} - y_1 \frac{d\phi(x, y+\Delta y_2+\theta_2\Delta y_1)}{dy}$$
$$= \Delta y_1 \Delta y_2 \frac{d^2\phi(x, y+\theta_3\Delta y_1+\theta_4\Delta y_2)}{dy^2}$$

where $0 < \theta_3, \theta_4 < 1$—;

As the lateral shears $\Delta y_1$ and $\Delta y_2$ approach zero, Eq. (3) thus will become $$d^2\phi/dy^2 = (2n+1)\pi(\Delta y_1 \Delta y_2) \quad (4)$$

If we want a display of the second derivative curve, a tilt $\delta$ is introduced between the wavefronts by rotating mirror 217 in the direction of arrow 217a. This means that the term $e^{i\alpha x}$ within the last bracket in Eq. (1) will be $e^{(i\alpha+\delta)x}$ instead.

This means that Eq. (2) will take the following form $$e^{i\{\phi(x,y)-\phi(x,y+\Delta y_1)\}} + e^{i\{\phi(x,y+\Delta y_2)-\phi(x,y+\Delta y_1+\Delta y_2)-\delta x\}}$$

and Eq. (3) will be modified to $$\phi(x,y) - \phi(x,y+\Delta y_1) - \phi(x,y+\Delta y_2) + \phi(x,y+\Delta y_1+\Delta y_2) + \delta x = (2n+1)\pi$$

and thus Equation (4) then becomes $$x = -\frac{\Delta y_1 \Delta y_2}{\delta} \frac{d^2\phi}{dy^2} + \frac{(2n+1)\pi}{\delta} \quad (5)$$

FIGS. 4A and 4B respectively show an object and the resulting fringe pattern produced with the present invention. The object shown in FIG. 4A is a completely transparent glass plate which is thicker on one end. Thus, the object shown in FIG. 4A could be described as a phase object. The resulting pattern of fringes is shown in FIG. 4B. Such a pattern could be generated using a 10 mw. He—Ne laser as light source 208. Shutter 209 was opened for one second during each exposure. The recording member 225 was photographic film produced under the trade name Kodak 649F. Mirror 217 was rotated slightly (e.g. one tenth of a degree) in the direction of arrow 217a in order to give fringe variations which indicate changes in the second derivative of the function which defines the object. The amount of rotation determines the number of fringes present. The shape of the fringes reveals the characteristics of object 11A.

In order to obtain the second derivative of the wavefront generated by variations in refractive index, object 11 would be replaced by the material which had special variations in refractive index. As an example in such a case, shutter 209 would be opened for one second. Then, recording medium 225 would be moved .04 inch and, then, the shutter would again be opened for one second. The image would be reconstructed as before.

It is noted that herein the invention is practiced using lateral shearing; however, like results could be achieved using other types of shear such as radial shear, reversion sheer, etc. It is also noted that the development step could be eliminated if a photographic medium, such as thermoplastic or photochromic, is used. As shown herein, the actual photographic medium exposed to the images is used in the reconstruction step. Naturally, copies could be used.

As the invention is described above, the two exposures of the recording medium are separated by a period of time. The same results could be obtained by separating the exposures by some other technique. The only requirement is that the light, which constitutes the first exposure, must be prevented from interacting, i.e. interfering, with the light which constitutes the second exposure. Naturally, if the two exposures are separated by time, the above is accomplished. Alternate techniques of separating the two exposures are possible. For example, the two exposures could occur simultaneously if the light which constituted one exposure is polarized in a first direction, while the light which forms the second exposure is polarized in an orthogonal direction. In a system where the two exposures occurred simultaneously, a plurality of optical elements, such as lenses and beam splitters, would have to be included, which would take the light emanating from imaging system 212, and which would divide this light into four beams, each of which created an image of object 11 at substantially the same place on recording medium 225. The four beams would have to be divided into two pairs, one pair of which was polarized in one direction, and one pair of which was polarized in an orthogonal direction. The images created by the two beams in each pair would have to be shifted slightly relative to each other, such as the relative shift introduced by plate 220, and both of the images created by one pair of beams would have to have an additional shift relative to the images created by the other pair of beams. This additional could, for example, be introduced by a set of shearing devices which shift both beams in one of the pairs of beams.

In the following claims, the fact that the various steps which constitute the invention are set out serially does not mean that these steps must take place sequentially. As explained above, the steps could be performed simultaneously.

While the invention has been particularly shown and described with reference to a preferred embodiment thereof, it will be understood by those skilled in the art that the foregoing and other changes in form and detail may be made therein without departing from the spirit and scope of the invention.

What is claimed is:

1. The method of obtaining a representation of the second derivative of the phase function which defines an object comprising the steps of:
    exposing a photosensitive recording medium to a first image hologram of said object, said hologram being generated by interacting two beams, each of which carry image information, the images generated by said two beams being slightly sheared relative to each other,
    moving the relative position of said object and said recording medium slightly,
    exposing said photosensitive recording medium to a second image hologram of said object while said object and said recording medium are in said moved relative position, while slightly changing the angle between the beams used to form said hologram, said second hologram being generated by interacting two beams, each of which carry image information, the images generated by said two beams being sheared in a manner similar to the shear introduced between the two beams used to generate said first image hologram,
    illuminating said hologram to generate an image of said object which has superimposed thereon interference fringes.

2. The method recited in claim 1 wherein said image holograms are generated by illuminating said object with coherent light.

3. The method recited in claim 1 wherein the shear introduced between said beams to generate said holograms is a lateral shear.

4. The method recited in claim 1 wherein said holograms are generated by creating a beam of light which carries image information, dividing said beam of light into two beams of light which are focussed on said recording medium to generate said hologram, one of said beams being slightly sheared relative to the other beam.

5. The method recited in claim 1 wherein the object is moved an amount equal to the shear between the beams usd to form each hologram.

6. The method recited in claim 1 wherein said shear and said movement are in the same direction.

7. The method recited in claim 1 wherein each beam focusses an image of said object on said photographic film.

8. The method of optically calculating the second derivative of the phase function which defines a wavefront comprising the steps of:
    exposing a photographic recording meduim to a first image hologram of said wavefront, said hologram being generated by interacting two beams, each of which carry image information, the images generated by said two beams being slightly sheared relative to each other,
    slightly moving the relative position between said wavefront and said recording medium, slightly changing the angle between the beams used to form said hologram,
    exposing said photographic film to a second image hologram of said wavefront, said second hologram being generated by interacting two beams, each of which carry image information, the images generated by said two beams being sheared in a manner similar to the shear introduced between the two beams used to generate said first image hologram,
    illuminating said hologram to generate an image which has superimposed thereon interference fringes.

References Cited

Principles of Optics; Born & Wolf, pp. 428–428, Pergamon Press, 1965.

RONALD L. WIBERT, Primary Examiner

CONRAD CLARK, Assistant Examiner

U.S. Cl. X.R.

350—3.5